// United States Patent [15] 3,662,158
Wong et al. [45] May 9, 1972

[54] VIDEO TAPE ANALYZER AND METHOD

[72] Inventors: Janet C. Wong, Foster City; Sidney C. Chao, Palo Alto, both of Calif.
[73] Assignee: Kaitronics, Belmont, Calif.

[22] Filed: Mar. 3, 1969
[21] Appl. No.: 803,919

[52] U.S. Cl. ....................235/92 PC, 178/6.6 DO, 235/92 R, 235/92 PB, 235/92 DN
[51] Int. Cl. ..........................................G06m 11/00
[58] Field of Search ..................................235/92, 151.13

[56] References Cited

UNITED STATES PATENTS

| | | | |
|---|---|---|---|
| 2,731,202 | 1/1956 | Pike | 235/92 |
| 3,160,741 | 12/1964 | Gottschall | 235/92 |
| 3,441,848 | 4/1969 | Valley | 324/71 |
| 3,225,332 | 12/1965 | Hallden | 340/172.5 |
| 3,288,986 | 11/1966 | Muto | 235/92 PC |

*Primary Examiner*—Maynard R. Wilbur
*Assistant Examiner*—Robert F. Gnuse
*Attorney*—Flehr, Hohbach, Test, Albritton & Herbert

[57] ABSTRACT

A video tape analyzer including means for generating and counting pulses indicative of defects in the tape. Digital display tubes indicate either the number of defects occurring during individual sampling periods of predetermined length or the total for successive periods. A chart recorder provides a profile record of the characteristics of the tape.

2 Claims, 3 Drawing Figures

PATENTED MAY 9 1972 3,662,158

INVENTORS
JANET C. WONG
SIDNEY C. CHAO

BY Flehr, Hohbach, Test, Albritton & Herbert
ATTORNEYS

VIDEO TAPE ANALYZER AND METHOD

BACKGROUND OF THE INVENTION

Prerecorded magnetic video tapes are widely used in television broadcasting studios today. The quality of these tapes varies from manufacturer to manufacturer and from studio to studio. Also, since video tapes wear with use, tapes of a given manufacture vary in condition depending upon the amount of use they have had.

Video tapes which are suitable for one type of use may not be suitable for all others. High-band color work requires tapes of a somewhat higher quality than does either low-band color work or monochromatic work. Likewise, tapes used for monochromatic pictures have different quality specifications from those used as master or dub tapes. Thus, it is desirable to grade video tapes according to the types of pictures for which they are suitable.

Heretofore, in most major television studios, video tapes have been subjected to inspection and monitoring by skilled technicians in order to ensure good picture quality. This method of examining tapes is costly from the standpoint of time, and it necessarily involves personal and subjective judgment which can result in errors. Also, standards of quality will vary from studio to studio, there being no uniform standard for the industry.

There is, therefore, a need for a video tape analyzer and method which overcome the aforementioned problems and other problems involving video tape.

SUMMARY AND OBJECTS OF THE INVENTION

The video tape analyzer of the present invention includes means for generating and counting pulses indicative of defects in video tapes. Digital display means indicates either the number of defects occurring during each sampling period or the cumulative total number of defects for successive sampling periods. A chart recorder provides a profile record of the condition of the tape.

In general, it is an object of the present invention to provide a video tape analyzer for determining the quality and condition of magnetic video tapes.

Another object of the invention is to provide a video tape analyzer of the above character which includes digital display means for indicating the number of tape defects occurring during sampling periods of predetermined length, as well as the number of defects in an entire reel of tape.

Another object of the invention is to provide a video tape analyzer of the above character which includes a chart recorder for producing a profile record of the characteristics of the tape.

Additional objects and features of the invention will be apparent from the following disclosure in which the preferred embodiment is set forth in detail in conjunction with the accompanying drawing.

DESCRIPTION OF THE PREFERRED EMBODIMENT

Figure 1:
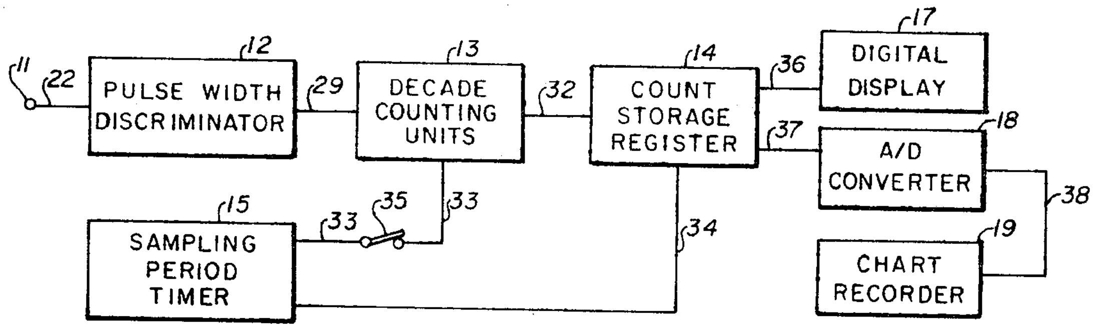
FIG. 1 is a block diagram of one embodiment of a video tape analyzer incorporating the present invention.

In the preferred embodiment, the video tape analyzer comprises generally means for generating pulses indicative of defects in a video tape, counter means for registering the number of pulses, and visual display means for displaying the number of defects. The pulse generating means includes an input terminal 11 and a pulse width discriminator 12; the counting means includes decade counting units 13, count storage register 14, and sampling period timer 15; and the visual display means includes digital display means 17, analog-to-digital converter 18, and chart recorder 19.

The input terminal 11 is adapted for connection to a conventional video recorder, not shown, for receiving signals indicative of the quality and condition of a video tape under test on the recorder. Most studio video recorders have a built-in drop-out detecting circuit which provides a convenient source of signals indicative of the condition and quality of the tape. This signal is received at input terminal 11 in the form of a series of pulses having widths, or durations, corresponding to the magnitudes of defects in the tape.

Figure 2:
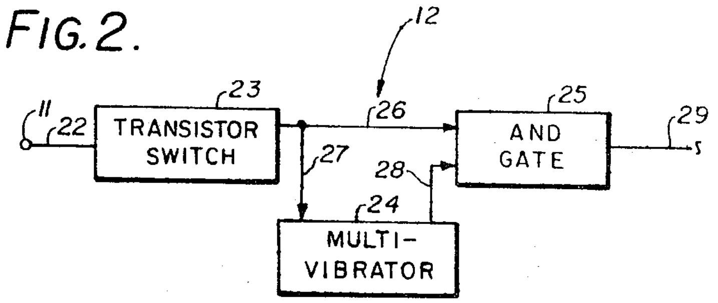
FIG. 2 is a block diagram of one embodiment of a pulse width discriminator circuit suitable for use in the video tape analyzer of FIG. 1.

The input terminal 11 is connected to the pulse width discriminator 12 by circuit 22. The pulse width discriminator 12 may be of conventional design. FIG. 2 illustrates a preferred circuit which includes a transistor switch 23, a monostable or one-shot multivibrator 24, and an AND-gate 25. Transistor switch 23 is biased such that it is not conducting and has a high output voltage in the absence of defect-indicating pulses at input terminal 11. Defect pulses cause switch 23 to turn on, resulting in a low output voltage. The output of transistor switch 23 is applied to a first input terminal of AND-gate 25 through conductor 26. This same signal is applied to multivibrator 24 through circuit 27 to provide a trigger signal for the multivibrator which in its stable state has a low output voltage. Thus, a pulse at input terminal 11 indicating a defect in the tape causes the output of multivibrator 24 to switch from its low value to its high value. This output is applied to a second input terminal of AND-gate 25 by conductor 28.

There is no output from AND-gate 25 unless both of its input terminals have low voltages applied thereto. Thus, when there is no defect pulse at input terminal 11, the output of AND-gate 25 is zero since the output of switch 23 is high and the multivibrator output is low. The arrival of a pulse at input terminal 11 causes the switch output to go low and the multivibrator output to go high for the duration of its time constant, with the output of AND-gate 25 remaining zero. There can be no output from AND-gate 25 as long as multivibrator 24 remains in its unstable state and has a high output voltage. When multivibrator 24 does return to its stable state, its output switches to its low value. If at this time the pulse is still present at terminal 11, the output of switch 23 will still be low, and AND-gate 25 will have an output other than zero. If the pulse at terminal 11 is of shorter duration than the time constant of multivibrator 24, the output of AND-gate 25 remains zero since the disappearance of the pulse causes switch 23 to return to its normal high before the multivibrator returns to its stable state. Thus, only pulses having a duration greater than the time constant of the multivibrator can produce an output from AND-gate 25 and pass through pulse width discriminator 12. By using a variable resistor as one of the elements which determines this time constant, means is provided for adjusting the minimum duration a pulse must have in order to pass through discriminator circuit 12.

The output of pulse width discriminator 12 is delivered to decade counting units 13 by circuit 29. Decade counting units 13 may be conventional decade counting units (DCU's) connected in cascade to provide multidigit capacity. In the preferred embodiment, three conventional DCU's are connected in cascade to provide a three-digit capacity. The count from DCU's 13 is transferred to storage register 14 through circuit 32. The count is transferred from storage register 14 to the visual display means in a manner hereinafter described.

Means is provided for counting the number of tape defects during individual sampling periods and for counting the total number of defects for successive periods. This means includes a sampling period timer 15 which is connected to decade counting units 13 and count storage register 14 through circuits 33 and 34, respectively.

The sampling period timer 15 includes a pulse generator for generating relatively narrow pulses which define the beginning and end of each sampling period. In the preferred embodiment, sampling periods of 15, 30, and 60 seconds are provided, and these are marked by pulses on the order of 25 microseconds.

The pulses applied to decade counting units 13 by circuit 33 cause the DCU's to be reset to zero. Thus, the DCU's are adapted for counting the number of pulses received from pulse width discriminator 12 during each sampling period.

The pulses delivered to count storage register 14 cause the count registered therein to be transferred to the visual display means. It is highly desirable that an accurate phase relationship be maintained between the pulses in circuits 33 and 34 so that the count will be transferred to the visual display means precisely at the end of each sampling period.

Means is also provided for selectively causing decade counting units 13 to count the cumulative total number of pulses from pulse width discriminator 12 for successive sampling periods. This means includes switch means 35 which is connected in series with circuit 33. When switch means 35 is in its closed position, as shown, pulses are delivered to decade counting units 13 at the beginning and end of each sampling period, and the count for each individual period is registered. When it is desired to count the cumulative number of pulses for successive periods, switch means 35 is opened, removing the control pulse from DCU's 13. The pulse applied to count storage register 14 through circuit 34 is not interrupted since it is still desirable to transfer the count registered therein to the visual display means at the end of each sampling period.

Means can also be provided for manually resetting the counter means to zero. In the preferred embodiment, this means includes a switch, not shown in FIG. 1, for applying a pulse simultaneously to conductors 33 and 34.

Digital display means 17 is connected to storage register 14 by means of circuit 36. In the preferred embodiment, this display means includes three Nixie tubes which are adapted for indicating the count registered in storage register 14 at the end of each sampling period. Thus, when decade counting units 13 are counting the number of pulses during each individual sampling period, the Nixie tubes display the count for each individual period. When decade counting units 13 are counting the total for successive periods, this cumulative total is indicated by the Nixie tubes.

Means is also included for providing a profile record of the condition and quality of the video tape. This means includes a chart recorder 19 which is responsive to the count in storage register 14. In the preferred embodiment, chart recorder 19 is connected to indicate the pulse count for each individual sampling period, regardless of whether the digital display means is indicating the count for the individual periods or the total count.

Typically, chart recorder 19 is an analog device, whereas the pulse count is stored in register 14 in digital form. Hence, an analog-to-digital converter 18 is connected between storage register 14 and chart recorder 19 by circuits 37 and 38. Analog-to-digital converter 18 can be a conventional A/D converter.

The chart recorder 19 can likewise be a conventional unit. It includes a pen 41 and a strip chart 42 which travels at a uniform speed. Pen 41 is adapted for movement in a direction normal to the travel of chart 42, and at any given time the position of pen 41 corresponds to the count in storage register 14. At the end of each sampling period, pen 41 scribes a mark on chart 42, which indicates by its vertical position the defect count for the period. The length of the mark in the horizontal direction, that is the direction of the chart travel, indicates the duration of the sampling period. Thus, marks 43 which correspond to a sampling period of 30 seconds are twice as long as marks 44 which correspond to a period of 15 seconds.

Chart 42 can be provided with reference lines, not shown, to facilitate the reading thereof. Thus, horizontally extending lines can be included to provide a vertical scale for the number of defects. Likewise, vertically extending lines can provide a convenient means of correlating the location of the information on the chart with location of the defects on the tape. In the preferred embodiment, the video tape moves at a speed 2,250 times that of the chart. Other speed relationships can be used and the chart calibrated accordingly.

Figure 3:
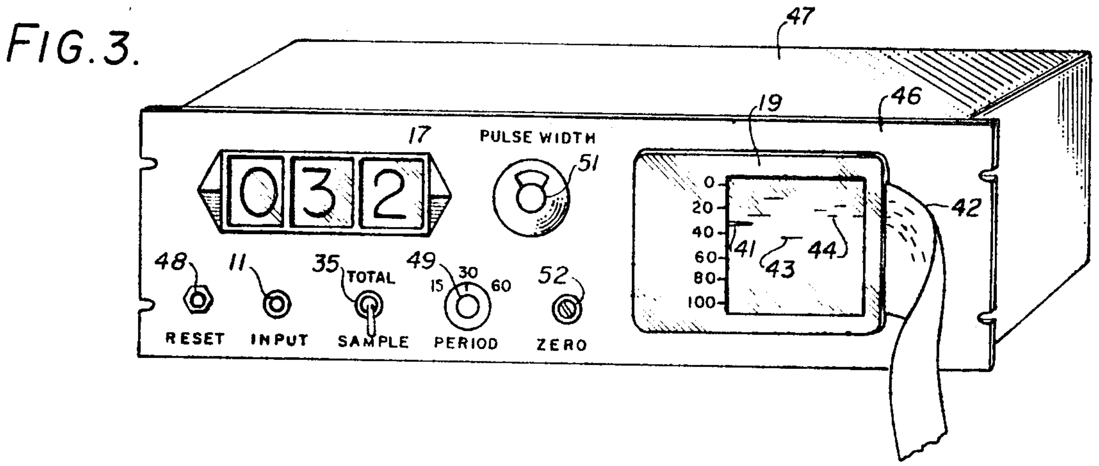
FIG. 3 is a perspective view of a unit incorporating the embodiment shown in FIG. 1.

FIG. 3 shows a practical arrangement of the embodiment heretofore described, which is suitable for mounting in a conventional rack cabinet. This unit includes a rack panel 46 and a cover assembly 47. Digital display means 17 and chart recorder 19 are mounted on panel 46, as are input terminal 11 and switch 35 which controls the reading of digital display means 17. A reset button 48 is provided for applying pulses to conductors 33 and 34 to reset the decade counting units and storage register in the manner hereinbefore described. Switch 49 provides selection among discrete values of resistance in the timing circuit of sampling period timer 15 to control the length of the sampling period. Control 51 provides adjustment of the time constant in the pulse width discriminator 12 to determine the minimum duration of pulses to be counted. Zero control 52 provides means for calibrating chart recorder 19 in a conventional manner. Power is supplied to the unit by conventional means, not shown.

Operation of the video tape analyzer can now be briefly described as follows. Let it be assumed that input terminal 11 has been connected to the drop-out detector of a video recorder upon which the tape to be tested is playing. Also, let it be assumed that control 51 has been adjusted so that pulse width discriminator 12 passes only pulses corresponding to tape defects which would result in visible imperfections on the television screen. Thus, minor defects, such as scratches, which would not be objectionable to the eye are not counted. Further, let it be assumed that switch 49 has been set for a sampling period of 30 seconds duration and that switch 35 is in its closed position.

The number of pulses appearing at the output of discriminator 12 during each 30-second sampling period is counted and registered in decade counting units 13 and count storage register 14. At the end of each period, this number is displayed by digital display means 17 and recorded on chart 42 by chart recorder 19. If it is desired to read the cumulative total number of defects for successive sampling periods, switch 35 can be opened, in which case digital display means 17 will indicate this total. However, chart recorder 19 will continue to indicate the drop-out count for each individual sampling period even through switch 35 is opened. Chart 42 thus provides a complete record of the condition of the video tape during each sampling period. When desired, the counts in counting units 13 and storage register 14 can be returned to zero by depressing reset button 48.

While the present invention has been described with specific reference to an instrument for analyzing video tape, its use is not limited thereto. As will be apparent to those familiar with the art, it can be readily adapted for use in other quality control situations for detecting non-uniformities and defects.

Also, as will be apparent to one familiar with the art, modifications and variations can be made in the various circuits used in the instrument without departing from the scope of the invention.

From the foregoing, it is apparent that there has been provided a video tape analyzer which permits an accurate and rapid analysis of the quality and condition of video tapes, thereby enabling the tapes to be graded and certified for various uses. The device enables this grading to be done on a standardized basis and, in addition, provides a permanent profile record of the characteristics of each tape.

We claim:

1. A video tape analyzer comprising an input terminal for receiving pulses indicative of drop-outs in a video tape, the width of said pulses corresponding to the duration of the drop-outs, a multivibrator having stable and unstable states, said multivibrator being connected to be switched to its unstable state by the leading edges of the drop-out pulses, an AND gate connected for receiving the drop-out pulses and the output of said multivibrator as inputs, said AND gate delivering an output pulse when a drop-out pulse has a duration greater than the time said multivibrator remains in its unstable state, decade counting means connected for counting the output pulses, display means including digital display means and a chart recorder, count storage means connected for storing the count registered by said counting means and transferring the stored count to said display means in response to control pulses, a sampling period timer connected for delivering control pulses to said storage means at a predetermined rate, successive ones of said control pulses defining the boundaries of sampling periods of predetermined length, the count being transferred to said display means at the ends of said sampling periods, and means for selectively applying said control pulses to said counting means to reset the same at the end of each sampling period.

2. A video tape analyzer comprising an input terminal for receiving pulses indicative of drop-outs in a video tape, the width of said pulses corresponding to the duration of the drop-outs, a source of reference pulses of predetermined duration, means for comparing the drop-out pulses with the reference pulses and delivering an output pulse when the duration of a drop-out pulse is greater than the duration of a reference pulse, decade counting means connected for counting the output pulses, display means, count storage means connected for storing the count registered by said counting means and transferring the stored count to said display means in response to control pulses, a sampling period timer connected for delivering control pulses to said storage means at a predetermined rate, successive ones of said control pulses defining the boundaries of sampling periods of predetermined length, the count being transferred to said display means at the ends of said sampling periods, and means for selectively applying said control pulses to said counting means to reset the same at the end of each sampling period.

* * * * *